United States Patent

Sweet et al.

[11] Patent Number: 5,736,227
[45] Date of Patent: *Apr. 7, 1998

[54] LAMINATED WOOD FLOORING PRODUCT AND WOOD FLOOR

[75] Inventors: James C. Sweet, Statesville; William S. Smith, Davidson, both of N.C.

[73] Assignee: Triangle Pacific Corporation, Dallas, Tex.

[*] Notice: The term of this patent shall not extend beyond the expiration date of Pat. No. 5,283,102.

[21] Appl. No.: 436,523

[22] Filed: Jun. 12, 1995

Related U.S. Application Data

[63] Continuation of Ser. No. 185,489, Jan. 24, 1994, abandoned, which is a continuation of Ser. No. 967,718, Oct. 28, 1992, Pat. No. 5,283,102.

[51] Int. Cl.$^6$ .................. B32B 3/00; E04F 13/08
[52] U.S. Cl. .................. 428/192; 428/33; 428/50; 428/53; 428/55; 428/58; 428/83; 428/172; 428/537.1; 428/542.2; 52/391; 52/392; 52/539
[58] Field of Search .................. 428/33, 50, 53, 428/55, 58, 83, 172, 192, 537.1, 542.2; 52/391, 392, 539, 290

[56] References Cited

U.S. PATENT DOCUMENTS

| | | | |
|---|---|---|---|
| 1,778,333 | 10/1930 | Neumann | 52/730.7 |
| 2,725,910 | 12/1955 | Kahr | 52/591.1 |
| 2,900,676 | 8/1959 | Kahr | 70/7 |
| 3,287,203 | 11/1966 | Elmendorf | 428/215 |
| 3,627,861 | 12/1971 | Timke | 428/49 |
| 3,817,012 | 6/1974 | Wack et al. | 428/49 |
| 4,471,012 | 9/1984 | Maxwell | 428/106 |
| 5,109,898 | 5/1992 | Schacht | 144/350 |
| 5,283,102 | 2/1994 | Sweet et al. | 428/167 |

FOREIGN PATENT DOCUMENTS 328341  4/1985  Switzerland.

OTHER PUBLICATIONS

Tibbals Flooring Company, Hartco The Quality Wood Flooring, 1988, pp. 2, 3, 4, 6, 8 and 10.

*Primary Examiner*—Donald Loney
*Attorney, Agent, or Firm*—Adams Law Firm, P.A.

[57] ABSTRACT

A wood flooring product for assembly into a wood floor is disclosed. The flooring product includes a top, decorative layer, an intermediate layer bonded to the top layer, and a base layer bonded to the intermediate layer. The top, intermediate and base layers are bonded in registration to define a laminated elongate wood flooring strip. A tongue and a groove are formed on respective side edges of the flooring strip. The tongue and groove extend along the length of the flooring strip, and lock adjacent flooring strips together side-to-side to form an assembled wood floor. The base layer has a multiplicity of closely spaced-apart scores cut transverse to the length of the flooring strip along substantially the entire length of the flooring strip. The scores relieve stress and increase flexibility in the wood strip for more closely adhering to irregularities of a sub-floor.

13 Claims, 4 Drawing Sheets

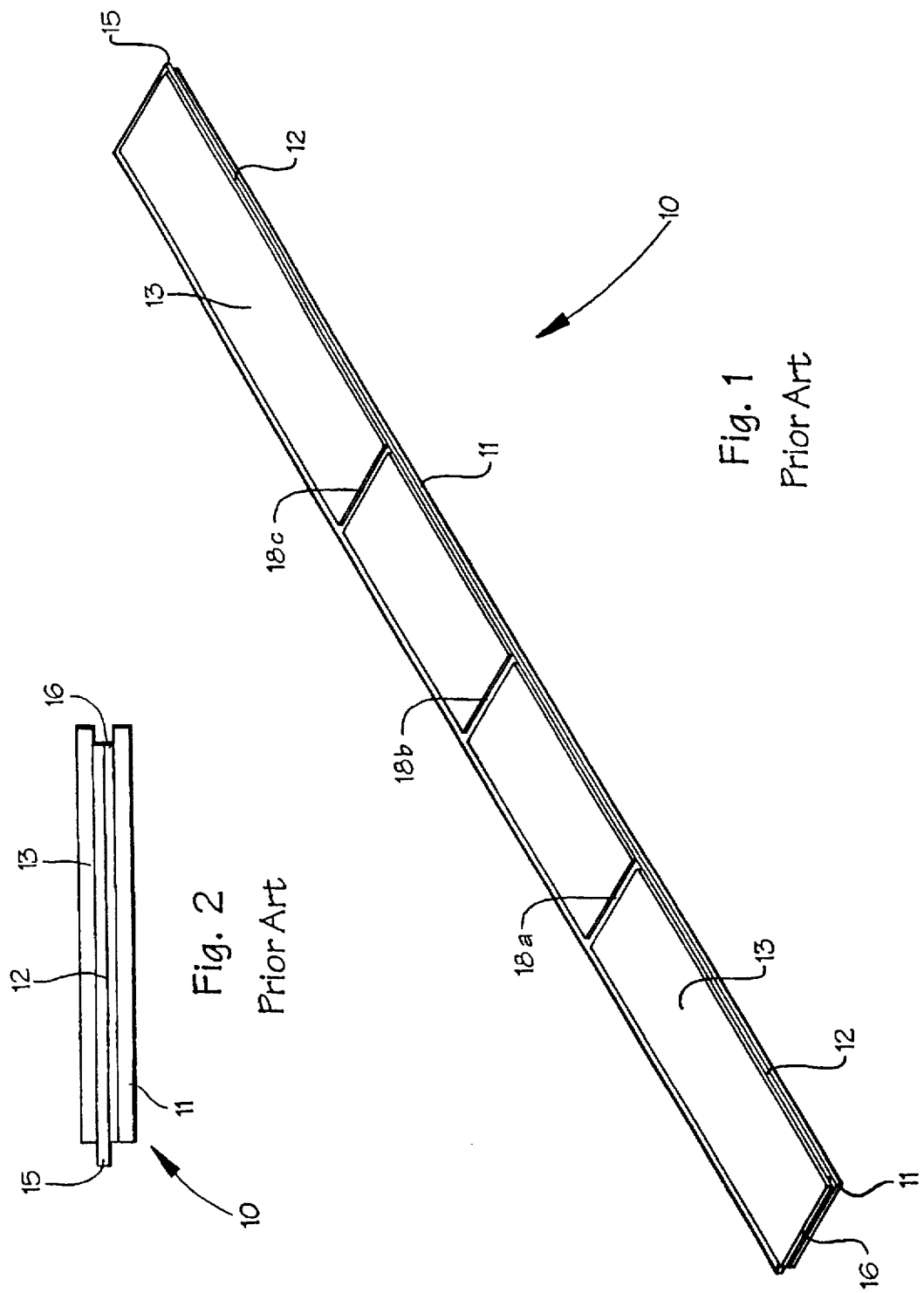

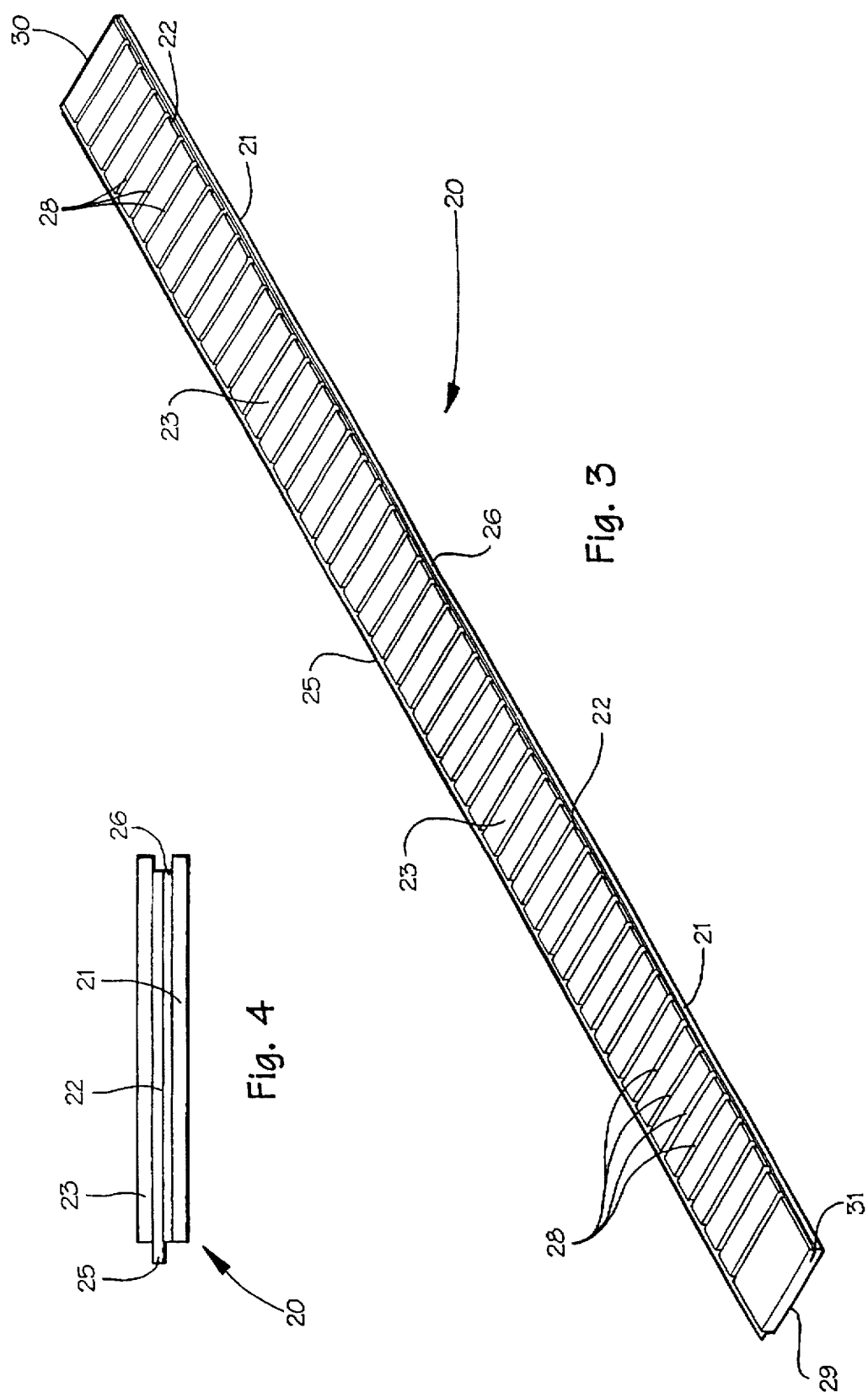

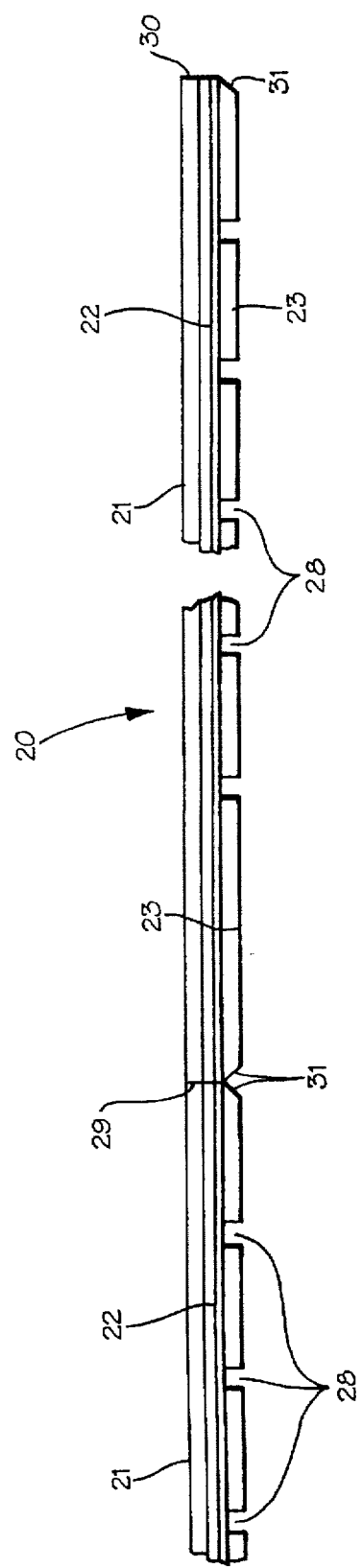

LAMINATED WOOD FLOORING PRODUCT AND WOOD FLOOR

This application is a continuation of application of U.S. Ser. No. 08/185,489 filed Jan. 24, 1994, now abandoned, which is continuation of U.S. Ser. No. 07/967,718 filed Oct. 28, 1992, U.S. Pat. No. 5,283,102.

TECHNICAL FIELD AND BACKGROUND OF THE INVENTION

This invention relates to a laminated wood flooring product, and a wood floor assembled from strips of the laminated wood flooring product. The flooring product which is the subject of this invention relates generally to products which are intended to simulate far more expensive solid wood flooring, such as oak, maple or ash. The desire to create a flooring product simulating solid wood flooring is apparent for reasons other than cost. For example, when a solid wood flooring panel is subjected to moisture, the width of the panel expands by as much as 11%. Because of this expansion, a stable solid wood floor can be difficult to maintain.

Width expansion and instability of wood is a result of the wood's hydroscopic nature. One way to stabilize an otherwise unstable wood product is to make it out of plywood. A piece of plywood is made by peeling a log to create thin wood strips. These strips are glued together and turned ninety degrees from the adjacent strips. This effectively stabilizes the unstable widthwise direction of the wood panel, thereby resulting in a more stable wood product.

In order to achieve a solid wood appearance without moisture expansion problems, a laminated wood flooring product was produced. This flooring product has a top, relatively thin veneer layer of oak, maple, ash or some other wood. The top layer is the exposed surface of the laminated wood floor when the floor is laid. When properly installed, the floor appears to be a solid wood floor, when in fact the floor is far less expensive than a solid wood floor. This lower cost is principally due to the use of less slow-growing hardwoods in favor of cheaper, faster-growing softwoods such as lauan or the like. Since laminated wood flooring products expand and contract in the presence of moisture by less than 2%, they provide a more stable floor.

Laminated wood floors are known in the art, but they are subject to a number of problems. For example, some laminated wood floors are specified as only being suitable for installation over certain types of subfloors. In other instances, subfloors must be removed because of poor condition, or because of irregularities in the surface which prevent proper installation. This is a particular problem since many older flooring materials contain asbestos, and are therefore expensive and potentially dangerous to remove. Prior art laminated wood floors are often subject to warping twisting and cupping, thereby requiring replacement or sanding to refurbish. In addition, a laminated wood floor which does not adhere to the subfloor at all points will create a hollow sound, and will flex slightly when walked on, clearly indicating that the floor is not a solid floor. Prior art laminated wood flooring strips are relatively stiff, thereby requiring a strong adhesive, such as a chlorinated solvent adhesive, to bond the floor to the subfloor. This is particularly true of subfloors which may have irregularities in the surface.

The chlorinated solvent adhesive used to bond the laminated wood flooring to the concrete had to be very rubbery, because despite the lamination, the flooring moved slightly through the years. This rubbery adhesive creates difficulties in installation. Furthermore, methyl chloroform is typically a principle ingredient in chlorinated solvent adhesives. Vapors emitted from this chemical are not only an environmental threat, but are also potentially damaging to household appliances, such as hot water heaters and furnaces. Regardless, even with a very strong adhesive, bowing, sideways sliding and similar problems are common.

In addition, prior art laminated wood flooring strips have tongue and groove locking edges on both ends and side edges. This prevents pieces from being cut to length except on the periphery of the floor being laid. The presence of tongue and groove locking edges on the side edges and ends of the strips means that each flooring strip, as installed, must be shifted both sideways and endways to lock the tongue and groove locking members with the mating members of the end and side adjacent strips. The presence of tongue and groove locking edges on the side edges and ends of the strips also creates a problem known as "overwood," meaning that the respective surfaces of adjacent strips, when installed, are not exactly flush.

A prior attempt has been made to correct these problems. The Hartco "Pattern-Plus" laminated wood floor is a two-piece laminated floor, which has small wooden "slats" glued to the back side of the wooden flooring strips to create a "slatted" appearance, with small spaces between each flat to add additional flexibility to the floor, and to permit conformation to slight irregularities in the subfloor. This product has tongue and groove locking edges on both ends and side edges. As is apparent, gluing numerous small pieces of wood to the back of the flooring strips is a costly and time-consuming process.

The invention according to this application solves these problems in an inexpensive and efficient manner.

SUMMARY OF THE INVENTION

Therefore, it is an object of the invention to provide a laminated wood floor which is inexpensive, easy to manufacture, easy to install, and which provides wear equivalent to a solid wood floor.

It is another object of the invention to provide a laminated wood floor which can be installed over virtually any time of existing flooring, including those containing hazardous materials such as asbestos.

It is another object of the invention to provide a laminated wood floor which does not warp, cup or twist.

It is another object of the invention to provide a laminated wood floor which can be refurbished without sanding.

It is another object of the invention to provide a laminated wood floor which conforms exactly to the subfloor and therefore sounds and feels solid when walked on.

It is another object of the invention to provide a laminated wood floor which permits the use of a latex adhesive to secure the laminated wood floor to the subfloor, instead of corrosive chlorinated solvent adhesives.

It is another object of the invention to provide a laminated wood flooring strip which does not bow either during or after installation.

It is another object of the invention to provide a laminated wood flooring strip which does not slide sideways, and where the ends of the laminated wood flooring strips are held level by the sides.

It is another object of the invention to provide a laminated wood flooring strips where cut pieces can be used anywhere on the floor, and therefore can be installed with less waste.

These and other objects of the present invention are achieved in the preferred embodiments disclosed below by providing a wood flooring product for assembly into a wood floor. The flooring product includes a top, decorative layer, an intermediate layer bonded to the top layer, and a base layer bonded to the intermediate layer. The top, intermediate and base layers are bonded in registration to define a laminated elongate wood flooring strip. Locking means extend along the length of the flooring strip on both side edges for locking adjacent flooring strips together side-to-side to form an assembled wood floor. The base layer has a multiplicity of closely spaced-apart scores cut transverse to the length of the flooring strip along substantially the entire length of the flooring strip to relieve stress and increase flexibility in the wood strip for more closely adhering to irregularities of a sub-floor.

According to one preferred embodiment of the invention, the locking means comprises a tongue formed on one side edge of the flooring strip and a mating groove on the other side edge of the flooring strip. Each of the tongue and the groove mate with complementary elements on adjacent flooring strips.

According to another preferred embodiment of the invention, the flooring strips include opposing end portions, the end portions each having a flat area perpendicular to the plane of the flooring strip for abutting engagement with like flat areas on adjacent flooring strips.

According to yet another preferred embodiment of the invention, the opposing end portions include an upper flat area perpendicular to the plane of the flooring strip for abutting engagement with like flat areas on adjacent flooring strips. The opposing end portions also include a lower, chamfered area for spacing the base layer of adjacent flooring strips apart from each other on opposing ends of the flooring strips.

Preferably, the scores are approximately one-eighth inch wide and are spaced-apart approximately one inch center-to-center.

According to one preferred embodiment of the invention, the scores extend into the base layer substantially the entire thickness of the base layer.

A wood floor assembled from wood flooring strips according to the invention is also described and claimed.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 1 is a perspective view of the bottom side of a prior art laminated wood flooring strip;

FIG. 2 is an enlarged end elevation of the prior art laminated wood flooring strip shown in FIG. 1;

FIG. 3 is a perspective view of the bottom side of a laminated wood flooring strip according to an embodiment of the invention;

FIG. 4 is a an enlarged end elevation of the laminated wood flooring strip shown in FIG. 3;

FIG. 5 is a fragmentary side elevation of two laminated wood flooring strips as shown in FIGS. 3 and 4, end to end.

Figure 6:
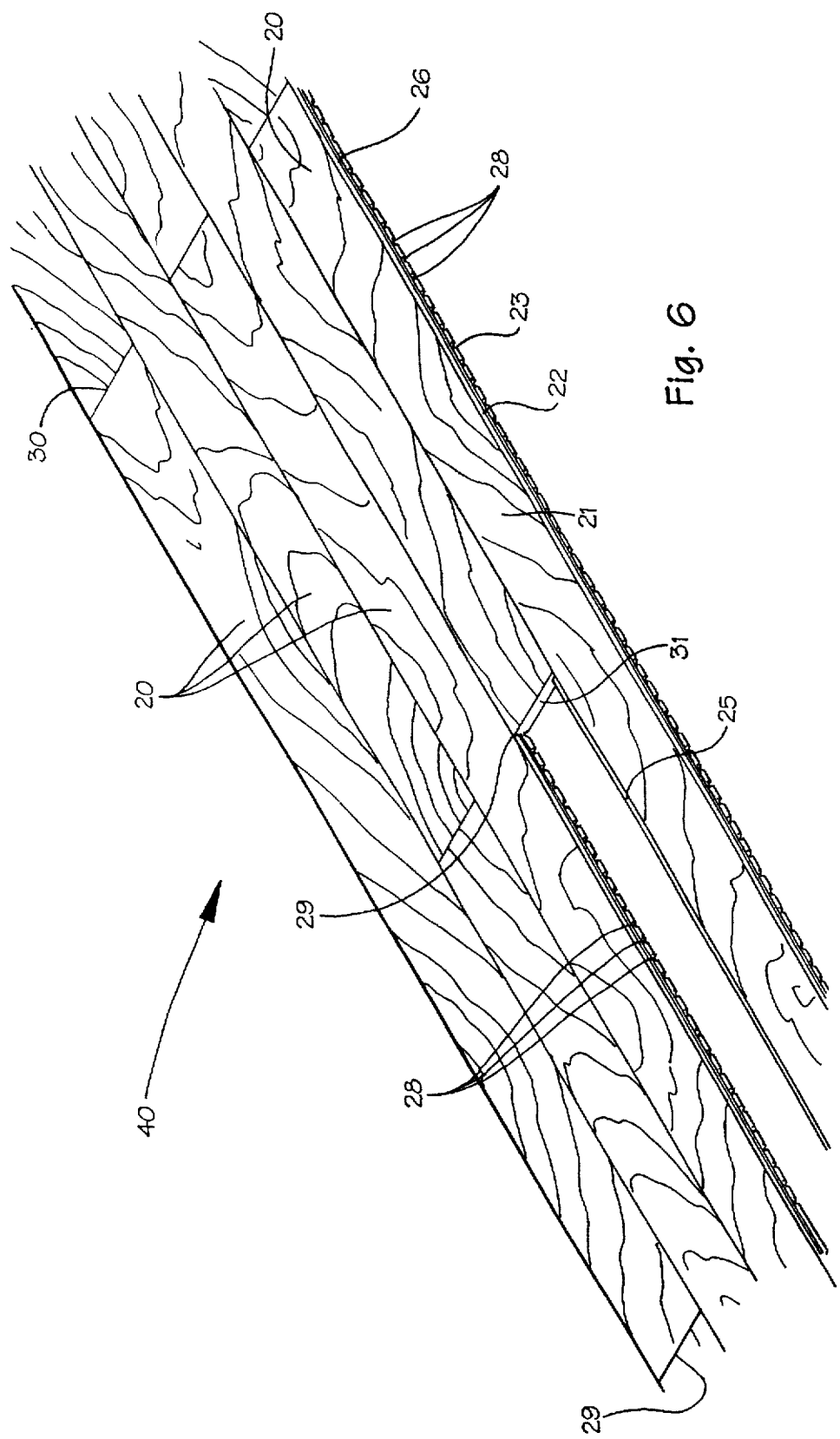
FIG. 6 is a fragmentary perspective view of a wood floor assembled from the laminated wood flooring strips shown in FIGS. 3, 4 and 5.

DESCRIPTION OF THE PREFERRED
EMBODIMENT AND BEST MODE

Referring now specifically to the drawings, a laminated wood flooring strip according to the prior art is illustrated in FIG. 1 and shown generally at reference numeral 10. The laminated wood flooring strip 10 according to the prior art is a conventional laminated wood flooring strip having three laminates, a top laminate 11, which is typically a veneer of a quality hardwood such as oak, ash or maple. An intermediate layer 12 is bonded to the underside of the top layer 11, leaving exposed the finished surface. The intermediate layer 12 has a grain perpendicular to the top layer 11 to provide dimensional stability to the product. A bottom layer 13, with a grain running in the same direction as the top layer 11 and perpendicular to the intermediate layer 12, is bonded to the intermediate layer 12. The intermediate layer 12 and bottom layer 13 are fabricated of relatively inexpensive wood, since only the top surface 11 is visible when the floor is installed.

Conventional laminated wood flooring strips, such as the laminated wood flooring strip 10 in FIG. 1, are typically manufactured in widths of from 1.5 to 7 inches, and in lengths of from 6 to 8 feet long. Depending on the width, the flooring material may be referred to as a strip or plank.

As is also shown in FIG. 1, a tongue 15 is machined into one end and one side of the laminated wood flooring strip 10, and a groove 16 is machined into the opposite end and side of laminated wood flooring strip 10.

Referring now to FIG. 2, when multiple laminated wood flooring strips 10 are installed side-by-side and end-to-end, the groove 16 of one laminated wood flooring strip 10 will mate with the tongue 15 of the adjacent laminated wood flooring strips 10. Generally, adjacent laminated wood flooring strips 10 are installed in a staggered configuration so that the ends do not coincide. Thus, a floor which is interlocked both on the ends and the sides is formed.

However, the provision of tongue and groove interlocking on the ends, as shown in FIGS. 1 and 2, can cause the ends of adjacent laminated wood flooring strips 10 to be uneven, particularly if the tongue and grooves 15 and 16 on the ends of the laminated wood flooring strip 10 are not in exact registration with the tongue and grooves 15 and 16 cut into the sides. This is relatively common, since it is relatively easy to obtain exact registration of the tongue and grooves extending along the length of the strips, but very difficult to obtain exact registration of the tongue and groove on the very short ends of the strips.

The laminated wood flooring strip 10 also includes three cross-cut scores 18a, 18b, and 18c in the bottom layer 13. Some other prior art products may have four or five such scores. These scores 18a–18c are intended to allow some flexibility to the laminated wood flooring strip 10, and to reduce bowing. Note that the scores 18a–18c are centered, and the portion of the laminated wood flooring strip 10 near the ends have no such scores. It has been observed that while a certain minimum amount of increased flexibility is provided by the scores 18a–18c, the amount is insufficient to provide an actual improvement in performance of the laminated wood flooring strip 10 when installed, and provides essentially no increase in the ability of the laminated wood flooring strip 10 to conform to irregularities in the subfloor.

Furthermore, the relatively stiff laminated wood flooring strip 10 requires a very strong adhesive, such as a chlorinated solvent adhesive, to securely bond it to the subfloor. The requirement for tongue and groove locking on the ends of the laminated wood flooring strip 10 as well as on the side edges necessitates that cut strips cannot be used except along the edges of the installed floor, where the edges will be covered by shoe molding or the like.

In distinct contrast to the laminated wood flooring strip 10 shown in FIGS. 1 and 2, a laminated wood flooring strip 20 which solves numerous problems in prior art flooring products is shown in FIGS. 3–6. Referring specifically to FIG. 3, the laminated wood flooring strip 20, as shown, is constructed of three layers. A top layer 21, which is typically a veneer of a quality hardwood such as oak, ash or maple forms the visible surface of the floor when installation is complete. An intermediate layer 22 is bonded to the underside of the top layer 21. The intermediate layer 22 has a grain perpendicular to the top layer 21 to provide dimensional stability to the product. A bottom layer 23, with a grain running in the same direction as the top layer 21 and perpendicular to the intermediate layer 22, is bonded to the intermediate layer 22. The intermediate layer 22 and bottom layer 23 are fabricated of relatively inexpensive wood, since, when the floor is installed, only the top surface 21 is visible. According to another embodiment of the invention (not shown), additional intermediate layers 22 may be included to form a four or five-layer laminated wood flooring strip.

As with the conventional laminated wood flooring strip of FIGS. 1 and 2, laminated wood flooring strip 20 is manufactured in widths of from 1.5 to 7 inches, and in lengths of from 6 inches to 8 feet long.

As is also shown in FIG. 4, a tongue 25 is machined into one side of laminated wood flooring strip 20, and a groove 26 is machined into the opposite side of laminated wood flooring strip 20. When multiple laminated wood flooring strips 20 are installed side-by-side and end-to-end, the groove 26 of one laminated wood flooring strip 20 will mate with the tongue 25 of the adjacent laminated wood flooring strips 20. Generally, adjacent laminated wood flooring strips 20 are installed in a staggered configuration so that the ends do not coincide. Thus, a floor such as shown in FIG. 6 which is interlocked on the sides is formed.

The bottom layer 23 of laminated wood flooring strip 20 includes a multiplicity of closely spaced-apart, cross-cut scores 28 which extend completely across the width of the laminated wood flooring strip 20 from side edge to side edge. The scores 28 are preferably positioned at uniform intervals, running substantially from one end of the laminated wood flooring strip 20 to the opposite end. In the exemplary embodiment shown and described, the scores 28 are each one-eighth inch wide and are spaced-apart one inch on center. The scores 28 extend to within approximately 1/32 inch of the boundary of the bottom layer 23 thickness.

By supplying the laminated wood flooring strip 20 with a multiplicity of scores 28, it becomes more flexible, and thus more easily conforms to any irregularities in the surface of the subfloor. The multiplicity of scores 28 substantially increases the flexibility of the laminated wood flooring strip 20. In addition, the scores 28 provide substantially increased surface area for bonding between the bottom layer 23 and the adhesive. The increased adhesion between the adhesive and the laminated wood flooring strip 20 permits a water-based latex adhesive to be used to bond the laminated wood flooring strips 20 to the subfloor. The scores 28 also act as "pockets" which receive and hold adhesive, thus substantially increasing resistance against shifting of the flooring strips 20, especially during installation and adhesive curing. The ability to use latex adhesive means that the floor and the installation tools are easily cleaned.

The laminated wood flooring strip 20 retains its shape after being laid, including any adjustment to irregularities in the subfloor. The laminated wood flooring strip 20 does not warp, cup or twist. For this reason, the laminated wood flooring strip 20 remains securely fastened to the subfloor and therefore sounds and feels solid when walked on.

The opposing ends 29 and 30 of the laminated wood flooring strip 20 are formed without tongue and groove locking means, but are cut to provide a abutting connection between the end 29 and the end 30 of adjacent laminated wood flooring strips 20. The abutting ends 29 and 30 of the laminated wood flooring strip 20 permit an absolutely flush joint which will not pull open. A chamfer 31 is formed at both ends 29 and 30 in the bottom layer 23 of the laminated wood flooring strip 20. The chamfer 31 forms an undercut area adjacent the lower edge of the ends 29 and 30. The chamfer 31 allows the laminated wood flooring strip 20 to flex freely in conformity with the surface of the subfloor, without effecting or otherwise interfering with the placement of adjacent laminated wood flooring strips 20. For this reason, adjacent, end-to-end laminated wood flooring strips 20 can be made to lie perfectly flush edge-to-edge, without using tongue and groove or other locking means. The ability to eliminate the tongue and groove locking means on the ends 29 and 30 of the flooring strips 20 simplifies installation, since each strip 20 can be placed onto the subfloor in exact endwise alignment with the end 29 of one flooring strip 20 flush against the end 30 of an adjacent flooring strip 20. Thus, the flooring strip 20 need only be shifted sideways to lock the tongue 25 of one flooring strip 20 into the groove 26 of the adjacent flooring strip 20.

The provision of abutting end engagement between end-to-end adjacent laminated wood flooring strips 20 provides a much smoother and more consistent floor surface, because the side edge tongue and groove connections 25 and 26 hold the ends 29 and 30, as well as the sides, level. Furthermore, the laminated wood flooring strip 20 as described in the above embodiment can be cut to length and pieced anywhere on the floor, since a tongue and groove or other positive locking means is no longer necessary to lock the ends 29 and 30 together with adjacent laminated wood flooring strips 20.

The number and spacing of the scores 28 can be varied depending on the width and length of the laminated wood flooring strip 20, as can the depth of the scores 28.

Referring now to FIG. 6, an assembly of laminated wood flooring strips 20 adjacently placed to form a wood floor surface 40 is illustrated. As shown, the side-edges' tongue and groove 25 and 26 and the ends 29 and 30 closely form to adjacent laminated wood flooring strips 20 to create a smooth and continuous floor surface 40.

A laminated wood flooring strip is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A wood flooring strip for assembly into a wood floor, said flooring strip comprising:

(a) a top, decorative wood layer;

(b) a base layer for being adhered to a supporting subfloor;

(c) at least one intermediate layer positioned intermediate said top layer and said bottom layer;

(d) said top, said at least one intermediate layer, and said base layer bonded in registration to each other to define a unitary laminated elongate wood flooring strip;

(e) locking means extending along the length of said flooring strip on both side edges for locking adjacent flooring strips together side-to-side to form an assembled wood floor, said locking means comprises a tongue formed on one side edge of the flooring strip and a mating groove on the other side edge of the flooring strip, each of said tongue and said groove for mating connection with complementary elements on adjacent flooring strips, said flooring strips including non-locking, opposing end portions, said end portions each having a first non-locking flat area encompassing the entire end portion surface area of at least the top, decorative wood layer for abutting engagement with like flat areas on adjacent flooring strips to form a substantially continuous, flat decorative flooring surface, and a second non-locking area encompassing the entire end portion surface area of at least the base layer for providing a gap between the base layers of adjacent flooring strips, and;

(f) said flooring strip having a lengthwise dimension of between 1.5 and 7 inches and a lengthwise dimension of between 2 feet and 8 feet.

2. A wood flooring strip according to claim 1, wherein said second non-locking area comprises a chamfer formed on the ends of at least the base layer for spacing the base layer of adjacent flooring strips apart from each other on opposing ends of the flooring strips.

3. A wood flooring strip according to claim 1, and including including stress-relieving means cooperating with said strip along its length, said stress-relieving means comprising a multiplicity of closely spaced-apart scores cut into the base layer of the flooring strip along substantially the entire length of the flooring strip to relieve stress and increase flexibility in the wood strip for more closely adhering to irregularities of a sub-floor.

4. A wood flooring strip according to claim 3, wherein said scores extend transverse to the length of the flooring strip and comprise approximately 12 percent of surface area of the base layer of the flooring strip.

5. A wood flooring strip according to claim 1, wherein said at least one intermediate layer comprises one intermediate layer and said flooring strip comprises a three-layer laminated flooring strip.

6. A wood flooring strip according to claim 1, wherein said at least one intermediate layer and said base layer each comprise wood.

7. A wood flooring strip for assembly into a wood floor, said flooring strip comprising:

(a) a top, decorative wood layer;

(b) a base layer for being adhered to a supporting subfloor;

(c) at least one intermediate layer positioned intermediate said top layer and said bottom layer;

(d) said top, said at least one intermediate layer, and said base layer bonded in registration to each other to define a unitary laminated elongate wood flooring strip;

(e) locking means extending along the length of said flooring strip on both side edges for locking adjacent flooring strips together side-to-side to form an assembled wood floor, for abutting engagement with like flat areas on adjacent flooring strips;

(f) said flooring strips including non-locking, opposing end portions for abutting engagement with like flat areas on adjacent flooring strips, said end portions each having a first non-locking flat area encompassing the entire end portion surface area of at least the top, decorative wood layer for abutting engagement with like flat areas on adjacent flooring strips to form a substantially continuous, flat decorative flooring surface, and a second non-locking area encompassing the entire end portion surface area of the base layer for providing a gap between the base layers of adjacent flooring strips; and (g) said flooring strip having a lengthwise dimension of between 1.5 to seven inches and a lengthwise dimension of between 6 inches and 8 feet.

8. A wood flooring strip according to claim 7, wherein said second non-locking area comprises a chamfer formed on the ends of at least the base layer for spacing the base layer of adjacent flooring strips apart from each other on opposing ends of the flooring strips.

9. A wood flooring strip according to claim 7, and including including stress-relieving means cooperating with said strip along its length, said stress-relieving means comprising a multiplicity of closely spaced-apart scores cut therein along substantially the entire length of the flooring strip to relieve stress and increase flexibility in the wood strip for more closely adhering to irregularities of a sub-floor.

10. A wood flooring strip according to claim 8, and including including stress-relieving means cooperating with said strip along its length, said stress-relieving means comprising a multiplicity of closely spaced-apart scores cut therein along substantially the entire length of the flooring strip to relieve stress and increase flexibility in the wood strip for more closely adhering to irregularities of a sub-floor.

11. A wood flooring strip according to claim 10, wherein said scores extend transverse to the length of the flooring strip and comprise approximately 12 percent of surface area of the base layer of the flooring strip.

12. A wood flooring strip according to claim 7, wherein said at least one intermediate layer comprises one intermediate layer and said flooring strip comprises a three-layer laminated flooring strip.

13. A wood flooring strip according to claim 7, wherein said at least one intermediate layer and said base layer each comprise wood.

* * * * *